[12] United States Patent
Farah et al.

(10) Patent No.: US 7,814,753 B2
(45) Date of Patent: Oct. 19, 2010

(54) LOW PROFILE ATTACHMENT HANGER SYSTEM FOR A COOLING LINER WITHIN A GAS TURBINE ENGINE SWIVEL EXHAUST DUCT

(75) Inventors: Jorge I. Farah, Glastonbury, CT (US); William G. Hoop, Tavares, FL (US)

(73) Assignee: United Technologies Corporation, Hartford, CT (US)

( * ) Notice: Subject to any disclaimer, the term of this patent is extended or adjusted under 35 U.S.C. 154(b) by 1120 days.

(21) Appl. No.: 11/492,412

(22) Filed: Jul. 25, 2006

(65) Prior Publication Data

US 2008/0022689 A1  Jan. 31, 2008

(51) Int. Cl.
    F02C 7/20 (2006.01)
(52) U.S. Cl. ............... 60/796; 60/232; 239/265.35; 29/889.22
(58) Field of Classification Search ............ 60/204, 60/232, 770, 771, 796; 239/265.19, 265.35, 239/265.37; 29/272, 455.1, 889.2, 889.22, 29/890.149
See application file for complete search history.

(56) References Cited

U.S. PATENT DOCUMENTS

| | | | | | |
|---|---|---|---|---|---|
| 3,260,049 | A | * | 7/1966 | Johnson | 239/265.35 |
| 3,441,220 | A | * | 4/1969 | Wildner | 239/265.35 |
| 3,557,402 | A | * | 1/1971 | Koehl | 16/380 |
| 3,989,193 | A | * | 11/1976 | Vedova et al. | 239/265.35 |
| 4,438,626 | A | * | 3/1984 | Berestecki | 60/800 |
| 4,465,252 | A | * | 8/1984 | Donovan et al. | 248/60 |
| 4,747,543 | A | * | 5/1988 | Madden | 239/127.3 |
| 5,934,564 | A | * | 8/1999 | Bouiller et al. | 239/265.37 |
| 2005/0155352 | A1 | * | 7/2005 | Agg | 60/770 |
| 2006/0112676 | A1 | * | 6/2006 | Cowan et al. | 60/266 |
| 2006/0137352 | A1 | * | 6/2006 | Prasad et al. | 60/761 |
| 2007/0151229 | A1 | * | 7/2007 | Farah et al. | 60/232 |

* cited by examiner

*Primary Examiner*—Michael Cuff
*Assistant Examiner*—Phutthiwat Wongwian
(74) *Attorney, Agent, or Firm*—Carlson, Gaskey & Olds PC

(57) ABSTRACT

An exhaust duct assembly includes a cooling liner spaced apart from an exhaust duct case that articulate for use in a short take off vertical landing (STOVL) type of aircraft. The cooling liner assembly is attached to the exhaust duct case through a foldable attachment hanger system. The foldable attachment hanger system provides a low profile (foldable up/down) for a limited access installation envelope typical of a three bearing swivel duct (3BSD) which rotates about three bearing planes to permit transition between a cruise configuration and a hover configuration. In this way, each cooling liner segment may be formed as a complete cylindrical member requiring joints only between the swivelable duct sections.

11 Claims, 12 Drawing Sheets

STOVL HOVER CONFIGURATION

STOVL CRUISE CONFIGURATION

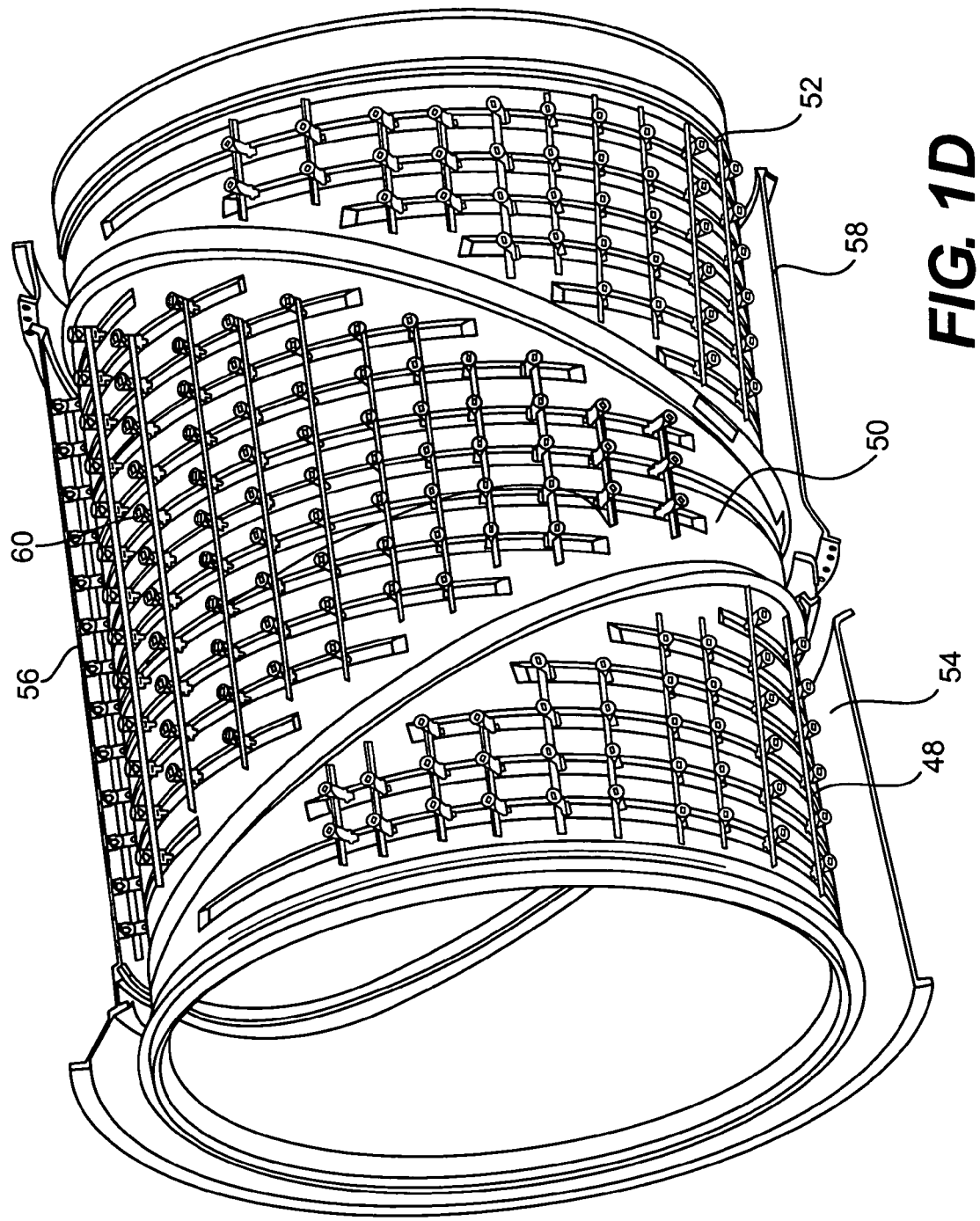

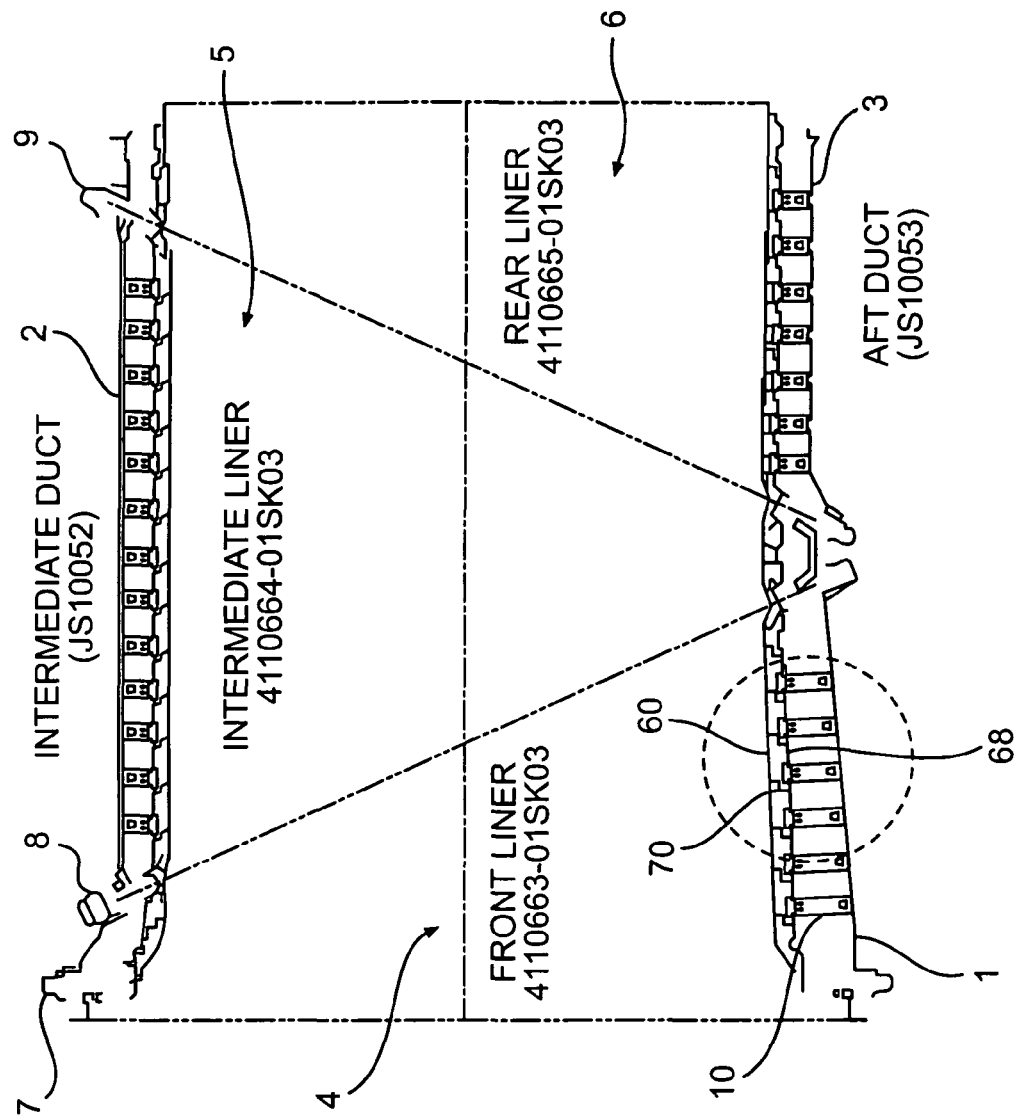
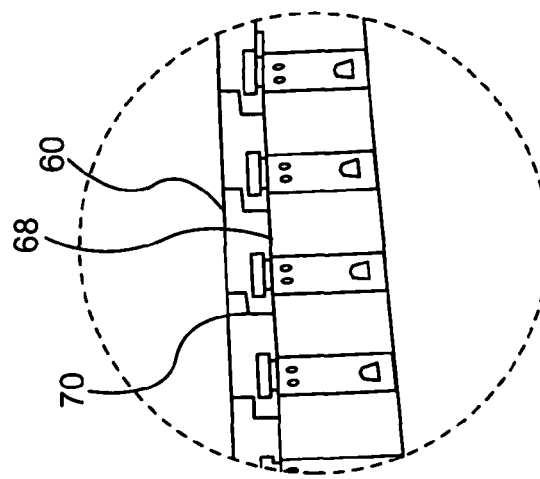
FIG. 1E

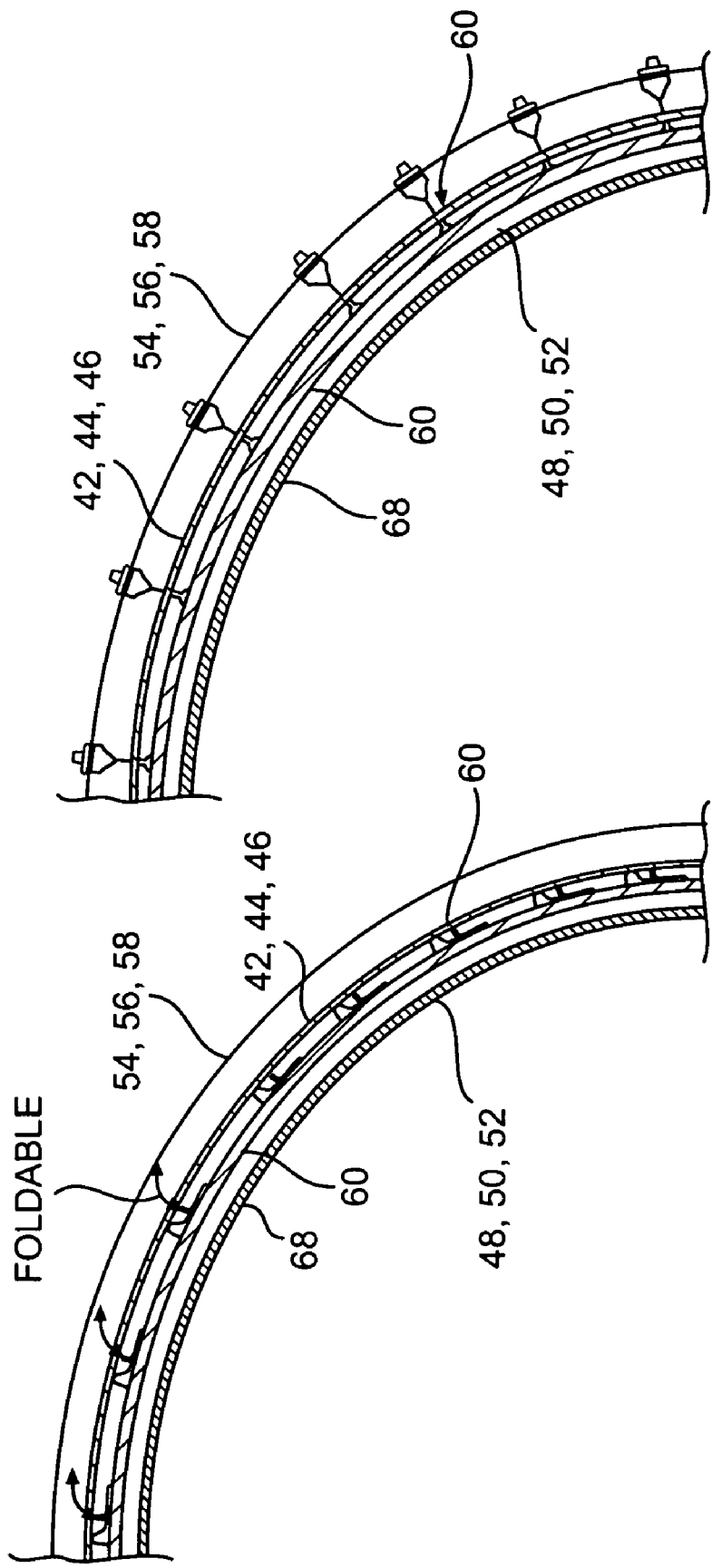

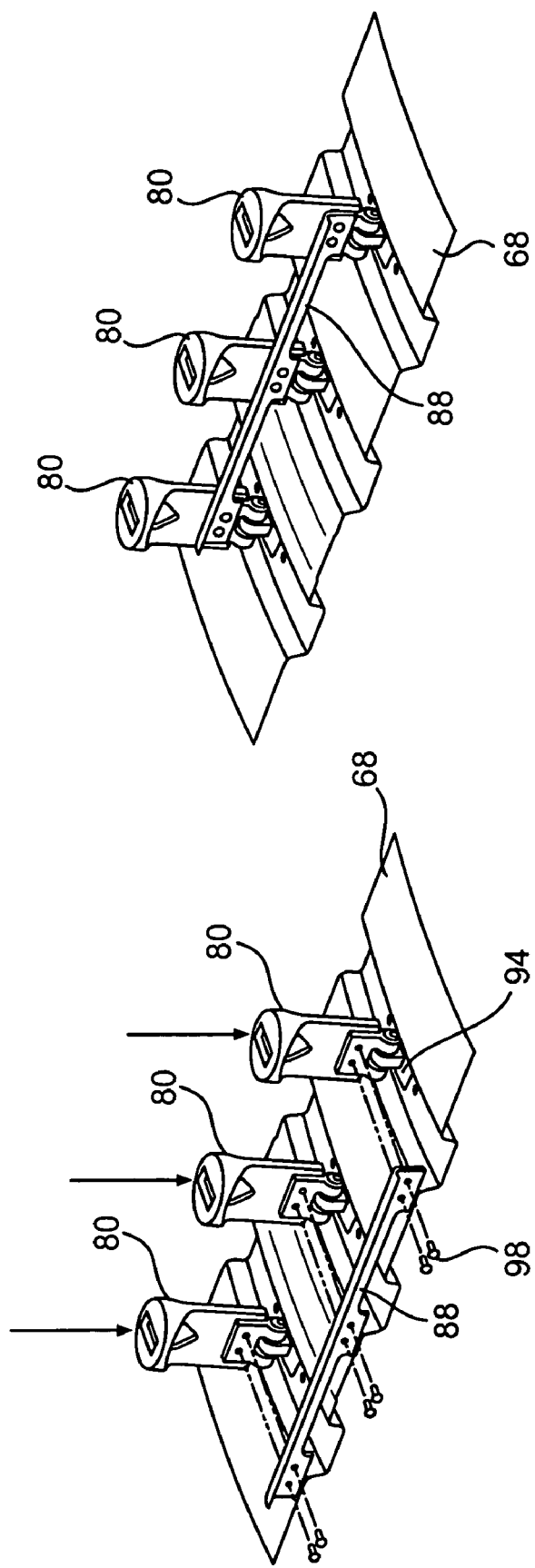

LOW PROFILE ATTACHMENT HANGER SYSTEM FOR A COOLING LINER WITHIN A GAS TURBINE ENGINE SWIVEL EXHAUST DUCT

BACKGROUND OF THE INVENTION

This invention was made with government support under Contract No.: N00019-02-C-3003 with the United States Navy. The government therefore has certain rights in this invention.

The present invention relates to gas turbine engines having a cooling liner, and more particularly to an attachment hanger system for a circumferential cooling liner within a swivelable exhaust duct.

In order to improve engine operation and performance, the usage of exhaust duct cooling air is carefully rationed. Since the cooling air is generally extracted from the engine and is then not utilized for producing thrust, this extracted cooling air is a penalty to the overall performance of the engine. In current gas turbine engine exhaust ducts, a liner is disposed between the engine's working medium (exhaust gas path) and the engine outer casing or duct. Cooling air typically extracted from the engine's compressor is flowed between the cooling liner and duct then discharged over the seals and flaps of the nozzle located at the rear end of the exhaust duct.

A relatively significant quantity of cooling air is required to properly cool the generally annular area to maintain a positive pressure within the cooling liner while being subjected to large core pressure gradients at various operating conditions. The cooling airflow is typically based at an airflow required for the most adverse pressure gradient during the most adverse operating condition. Furthermore, recent aircraft include exhaust ducts which can vector through relative swiveling between exhaust duct segments which are interconnected through bearing arrangements may further complicate cooling liner arrangements.

To accommodate the multiple duct segments and intermediate bearing systems, a multitude of individual cooling liner segments are assembled within the duct to permit passage and assembly through the upstream bearing obstructions. Although effective, each liner segment needs to be individually fastened to the duct case and each liner segment needs to be sealed to the adjoining liner segment. This may result in a weight and manufacturing penalty for redundant parts, loss of sealing efficiency and a significant number of non-desirable joints between each individual liner segment.

Accordingly, it is desirable to provide a cooling liner assembly for a swivelable exhaust duct which minimizes the number of cooling liner segment joints to increase sealing efficiency while reducing weight, maintenance requirements, and assembly complications.

SUMMARY OF THE INVENTION

The exhaust duct assembly that articulates for use in a short take off vertical landing (STOVL) type of aircraft according to the present invention includes a cooling liner spaced apart from and extending over a portion of an engine exhaust duct. The cooling liner includes a hot sheet separated from a cold sheet by a multitude of stiffeners. The cooling liner is attached to the exhaust duct case through a foldable attachment hanger system.

The foldable attachment hanger system provides a low profile (foldable up/down) for a limited access installation envelope. A series of cylindrical cooling liner segments (inboard) are insertable into a fully assembled 3 bearing swivel duct (outboard) which rotates about three bearing planes to permit transition between a cruise configuration and a hover configuration.

Each cylindrical cooling liner segment provides a reduced cross-sectional area through fold-down of the foldable attachment hanger system in order to pass the cylindrical cooling liner segment through the bearing joints within the duct case. Once past the bearing joint obstruction the cooling liner is attached to the duct case by folding-up the foldable attachment hanger system. In this way, each cooling liner segment may be formed as a tubular member requiring joints only between the swivelable duct sections.

The present invention therefore provides a cooling liner assembly for a swivelable exhaust duct which minimizes the number of cooling liner segment joints to increase sealing efficiency while reducing weight, maintenance requirements, and assembly complications.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1D is an expanded partially fragmented view of a cooling liner within the exhaust duct assembly;

FIG. 1E is an expanded view of a cooling liner within the exhaust duct assembly;

FIG. 2A is a transverse sectional view of the exhaust duct assembly with a foldable attachment hanger system in a folded position.

FIG. 2B is a transverse sectional view of the exhaust duct assembly with a foldable attachment hanger system in an unfolded position.

FIG. 5A is an exploded view of a portion of a row of duct brackets being attached to a multitude of pin-hinge-cold sheet bracket assemblies as illustrated in FIG. 4B;

FIG. 5B is a perspective view of the row of duct brackets as attached to the cold sheet through an axial stiffener;

DETAILED DESCRIPTION OF THE PREFERRED EMBODIMENT

Figure 1B:
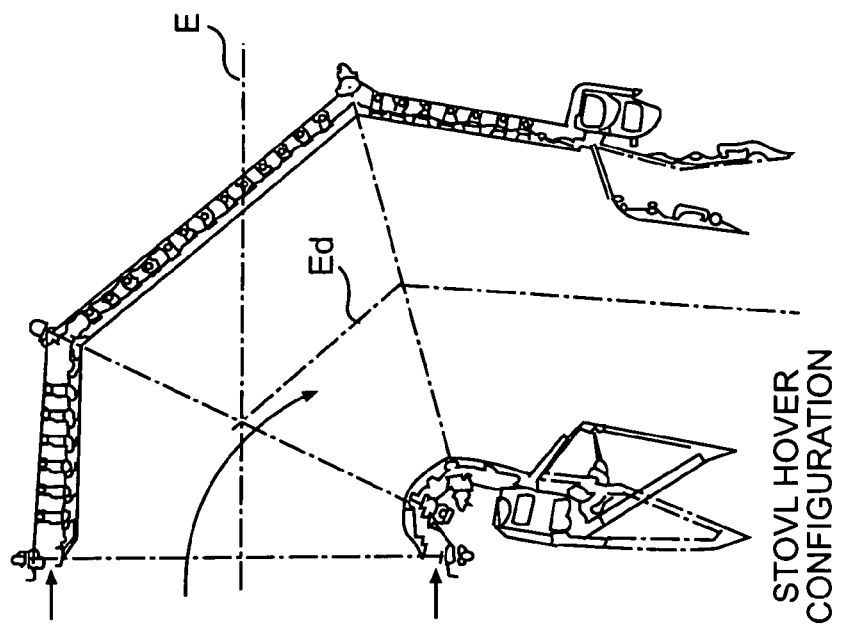
FIG. 1B is a cross sectional side elevation view of a variable geometry exhaust duct in a hover position.
Figure 1A:
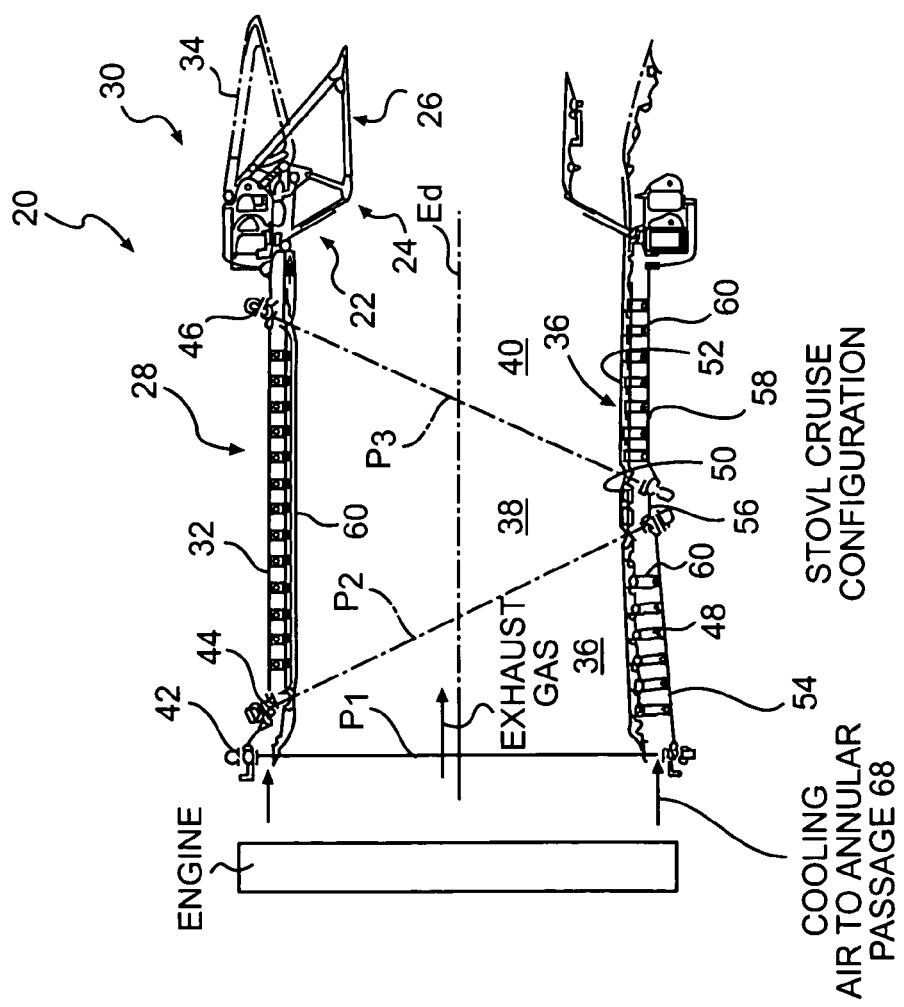
FIG. 1A is a cross sectional side elevation view of a variable geometry exhaust duct in a cruise position.

FIG. 1A illustrates a sectional view of an exhaust duct assembly 20 for a gas turbine engine in both an open position (phantom lines), typical of afterburning operation, and in a closed position (solid lines), typical of non-afterburning operation. In its preferred embodiment this invention is utilized on an exhaust duct assembly that articulate for use in a short take off vertical landing (STOVL) type of aircraft.

The exhaust duct assembly 20 is of the convergent-divergent type having a convergent flap region 22, a throat region 24, and a divergent flap region 26. The exhaust duct assembly 20 includes an exhaust duct section 28 which communicates with an exhaust nozzle 30.

The exhaust duct section 28 as illustrated herein is a three bearing swivel duct (3BSD) which rotates about three bearing planes ($P_1$, $P_2$, $P_3$) to permit transition between a cruise configuration in which the exhaust duct axis Ed is arranged along an engine axis E (FIG. 1A) and a hover configuration in which the exhaust duct axis Ed is articulated to a position transverse to the engine axis E (FIG. 1B). The outer wall of the exhaust duct section 28 is formed from an exhaust duct case 32 having an aerodynamic external flap system 34.

The exhaust duct section 28 includes a forward exhaust duct segment 36, an intermediate exhaust duct segment 38 and a rear exhaust duct segment 40. The forward exhaust duct segment 36 is rotatable about the axis E at a first bearing joint 42, the intermediate exhaust duct segment 38 rotates relative to the forward exhaust duct segment 36 at a second bearing joint 44, and the rear exhaust duct segment 40 rotates relative to the intermediate duct segment 38 at a third bearing joint 46. The first bearing joint 42 is disposed along the first bearing plane $P_1$, the second bearing joint 44 is disposed along the second bearing plane $P_2$ and the third bearing joint 46 is disposed along a third bearing plane $P_3$. The second bearing joint 44 and the third bearing joint 46 are generally disposed at a non-normal angle relative the engine axis E.

Each of the forward, intermediate and rear exhaust duct segment 36, 38, 40 include a forward, intermediate and rear cooling liner segment 48, 50, 52 which are exposed to the combustion gases and a forward, intermediate and rear outer duct case segment 54, 56, 58 (FIG. 1C) spaced therefrom by a foldable attachment hanger system 60 (FIG. 1D). It should be understood that each of the forward, intermediate and rear cooling liner segment 48, 50, 52 is an assembly that typically includes a hot sheet 66 separated from a corrugated cold sheet 68 by a multitude of stiffeners 70 (FIG. 1E). It should also be understood that the term "corrugation" encompasses various rippled or non-planar surfaces that are not to be limited to only the specific "corrugation" disclosed in the illustrated embodiment.

The foldable attachment hanger system 60 are attached between the cold sheet 68 of the forward, intermediate and rear cooling liner segment 48, 50, 52 and the respective forward, intermediate and rear outer duct case segment 54, 56, 58. The foldable attachment hanger system 60 at least partially permits for differential thermal expansion between the cold sheet 68 and the hot sheet 66. An annular passage may be defined between the forward, intermediate and rear cooling liner segment 48, 50, 56 and the forward, intermediate and rear outer duct cases 58, 60, 62 to provide passage of cooling air utilized for insulating the forward, intermediate and rear cooling liner segment 48, 50, 56.

Preferably, the forward, intermediate and rear cooling liner segment 48, 50, 52 are complete tubular members which are assembled and disassembled into their respective forward, intermediate and rear outer duct case segments 54, 56, 58 without requiring disassembly of the forward, intermediate and rear outer duct case segments 54, 56, 58 and the first, second and third bearing joint 42, 44 and 46 because of the foldable attachment hanger system 60 (FIGS. 2A and 2B).

The foldable attachment hanger system 60 folds-down (FIG. 2A) permitting each of the entire tubular cooling liner segments 48, 50, 56 to pass through the radial obstruction defined by the first, second and third bearing joint 42, 44 and 46. Once past the radial obstructions, the foldable attachment hanger system 60 fold-up (FIG. 2B) for subsequent mechanical attachment to the respective outer duct case segment 54, 56, 58 from the outside thereof. The result is reduction in weight and cost, increase in sealing efficiency and minimization of joints within the exhaust duct assembly 20. It should be understood that foldable attachment hanger system 60 includes a multitude of rows within each forward, intermediate and rear cooling liner segment 48, 50, 52 that are generally likewise arranged such that detailed explanation may be constrained to a single hanger assembly 72 from a portion of one row of the foldable attachment hanger system 60 as each hanger assembly 72 will be essentially the same.

Figure 3:
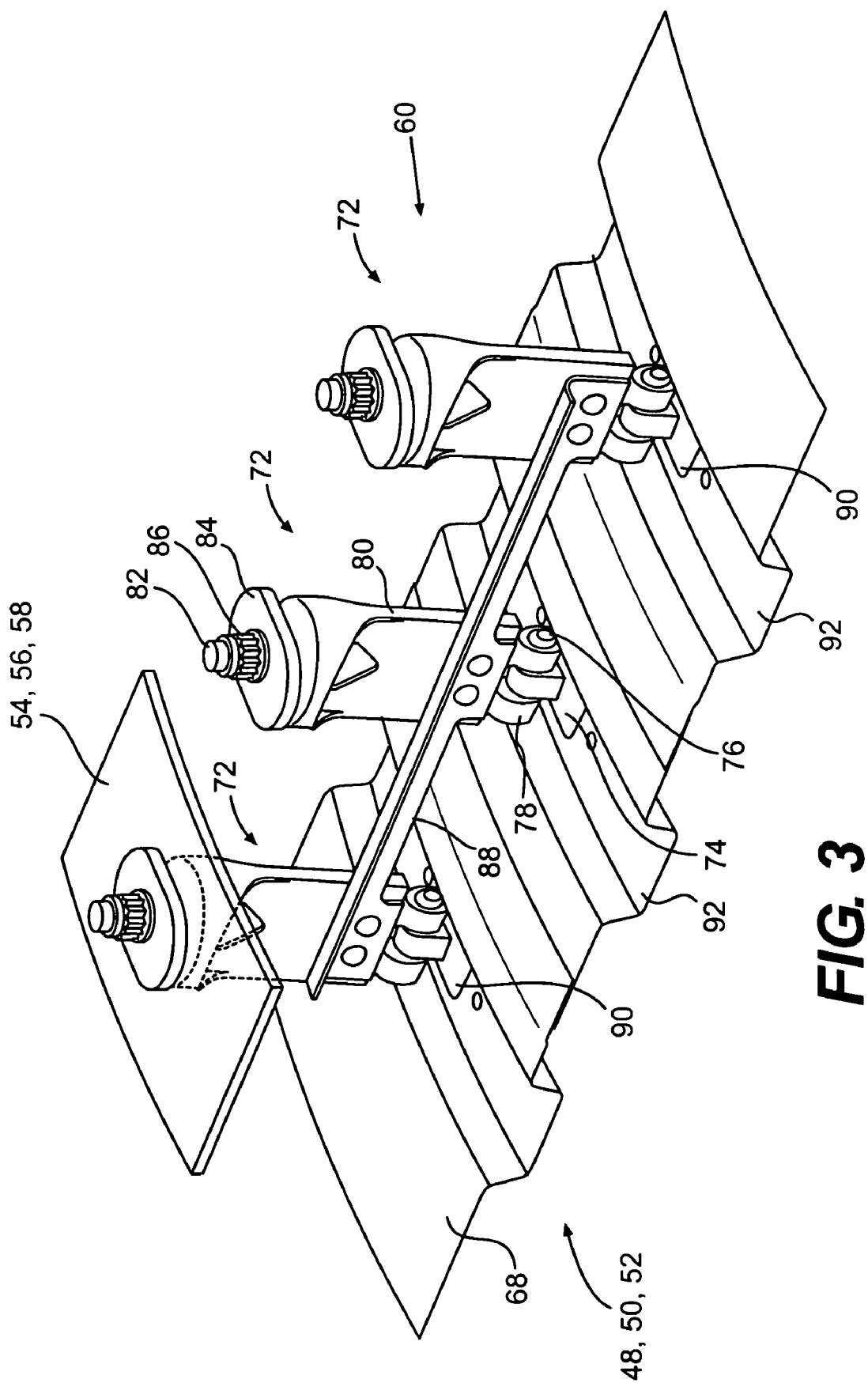
FIG. 3 is a perspective view illustrating the foldable attachment hanger system between a cold sheet of cooling liner assembly and an outer exhaust duct case.

Referring to FIG. 3, a portion of one row of the foldable attachment hanger system 60 is shown assembled between the cold sheet 68 of the forward, intermediate and rear cooling liner segment 48, 50, 52 and the respective forward, intermediate and rear outer duct case segment 54, 56, 58. The foldable attachment hanger system 60 provides for axial locating liner to duct case and permits thermally free axial growth.

Each hanger assembly 72 of the foldable attachment hanger system 60 includes a cold sheet bracket 74, a pin 76, a hinge 78, duct bracket 80, a T-bolt 82, a flanged bushing 84 and a threaded fastener 86. An axial stiffener 88 is preferably attached such as through rivets to a multitude of hanger assemblies 72 to increase axial rigidity and facilitate assembly.

Figure 4A:
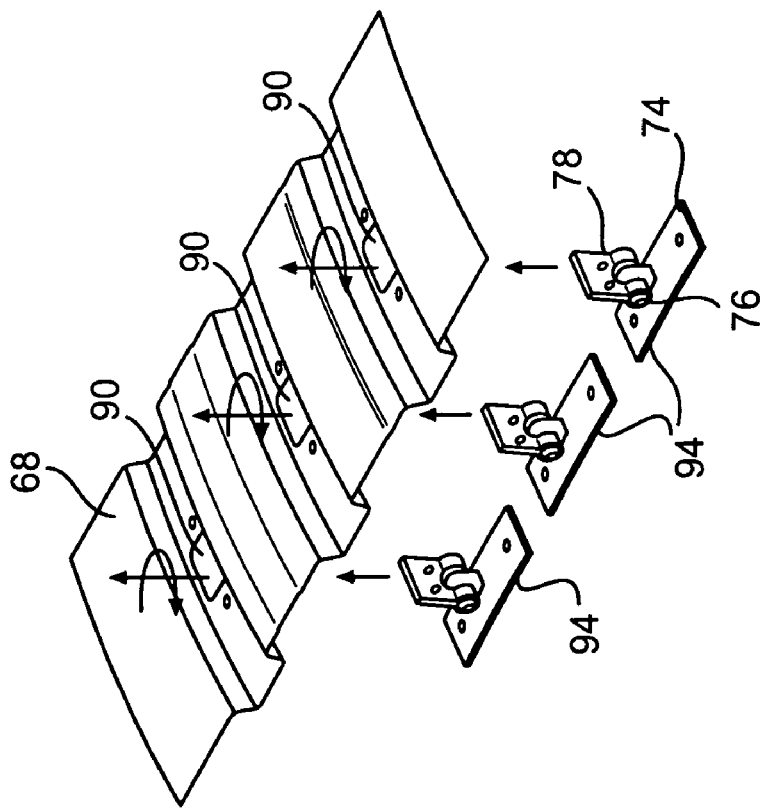
FIG. 4A is an exploded view of a multitude of pin-hinge-cold sheet bracket assemblies prior to installation in a cold sheet of the cooling liner assembly.
Figure 4B:
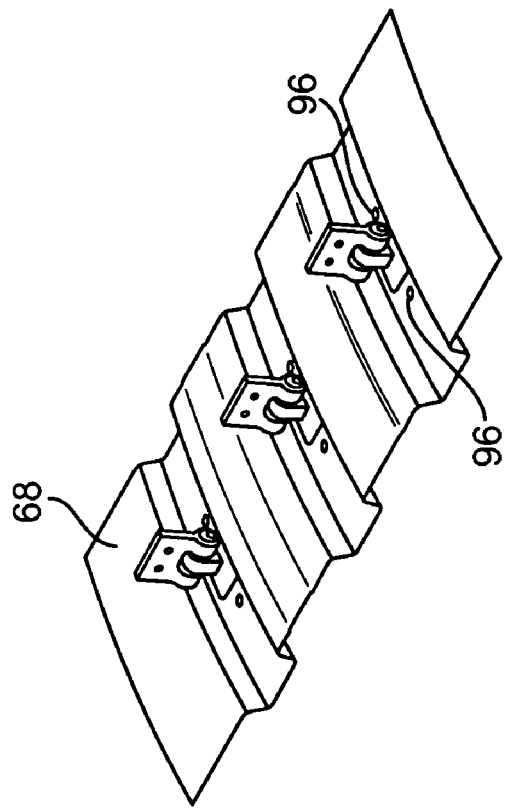
FIG. 4B is an exploded view of a multitude of pin-hinge-cold sheet bracket assemblies after installation in a cold sheet of the cooling liner assembly.

To assemble the forward, intermediate and rear cooling liner segment 48, 50, 52 into the assembled exhaust duct section 28 (FIG. 1D) the corrugated cold sheet 68 of each of the forward, intermediate and rear cooling liner segment 48, 50, 52 are provided with rectilinear openings 90 within a multitude of corrugation valleys 92. A pre-assembled pin-hinge-cold sheet bracket assembly 94 (FIG. 4A) is inserted through the cold sheet opening 90 (FIG. 4A) then rotated ninety degrees to align the cold sheet bracket 74 with the corrugation 92 (FIG. 4B). Each cold sheet bracket 74 is located on the stiff geometry offered by the liner corrugation 92 providing for an efficient load path. The pin-hinge-cold sheet bracket assembly 94 to pin 76 interface preferably is then installed with fasteners 96 such as solid rivets, adhesive or the like.

Figure 6:
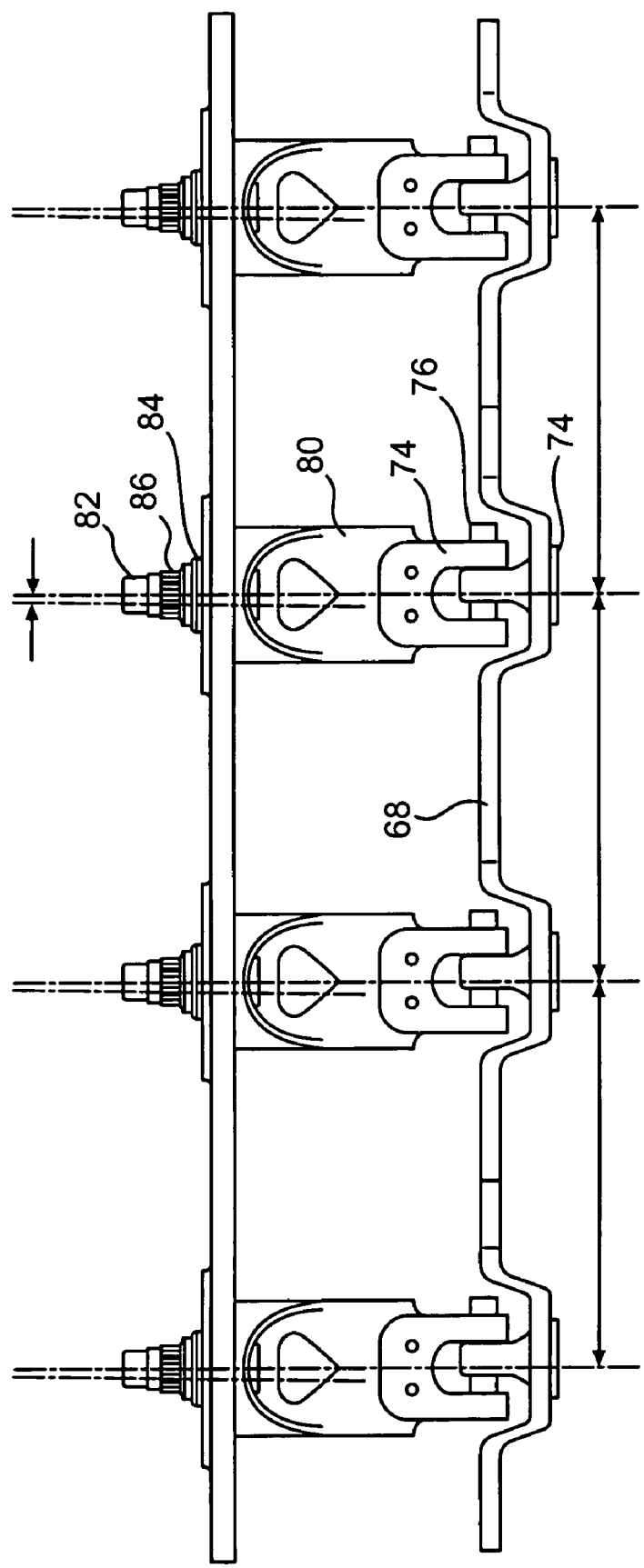
FIG. 6 is a longitudinal sectional side view of a portion of a row of the foldable attachment hanger system in a shifted position illustrating a slider feature thereof.

Referring to FIG. 5A, once the pin-hinge-cold sheet bracket assembly 94 are installed, a duct bracket 80 is placed in each hinge 78, then secured with fasteners 98 such as solid rivets, adhesive or the like. Preferably, the axial stiffener 88 is secured with the same fasteners 98 to connect a row of duct brackets 80 (FIG. 5B). The pin-hinge-cold sheet bracket assembly 94 incorporates a slider feature that allows the duct bracket 80 to clear the respective duct case 54, 56, 58 inner diameter as the duct bracket is folded-up into position (FIG. 6).

Figure 1C:
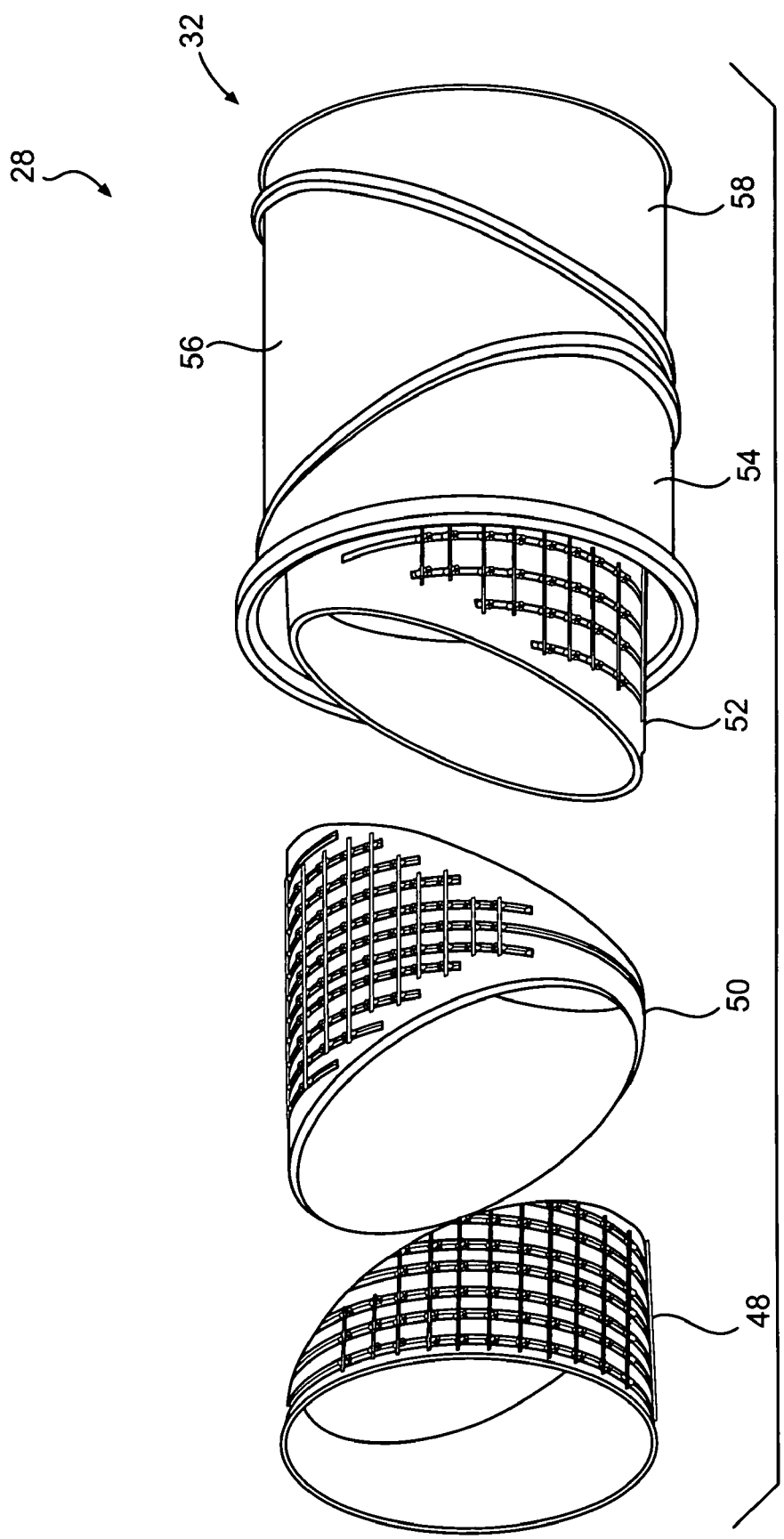
FIG. 1C is an exploded perspective view of the exhaust duct assembly.

At this point, the foldable attachment hanger system 60 may be folded-down into the corrugation (FIG. 2A) permitting the entire tubular cooling liners 48, 50, 56 to pass through the upstream obstruction of the bearing joints 42, 44 and 46. This may be performed sequentially, or the tubular cooling liners 48, 50, 56 may be assembled together then inserted as a sub assembly into the exhaust duct section 28 (FIG. 1C). Once past the bearing joints 42, 44 and 46 obstructions, the foldable attachment hanger system 60 is folded-up (FIG. 2B) and subsequently mechanically attachment to the respective duct case 54, 56, 58.

Figure 7C:
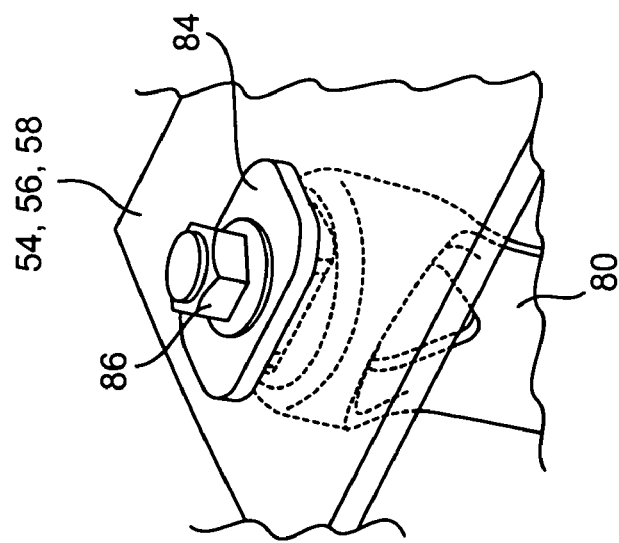
FIG. 7C is a perspective view of the duct bracket as attached to an exhaust duct case.
Figure 7B:
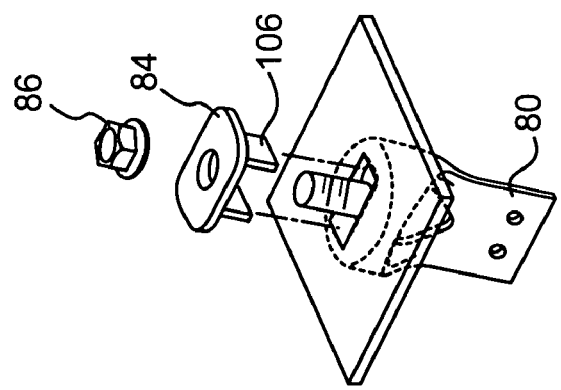
FIG. 7B is an exploded view of a duct bracket with the T-bolt rotationally installed.
Figure 7A:
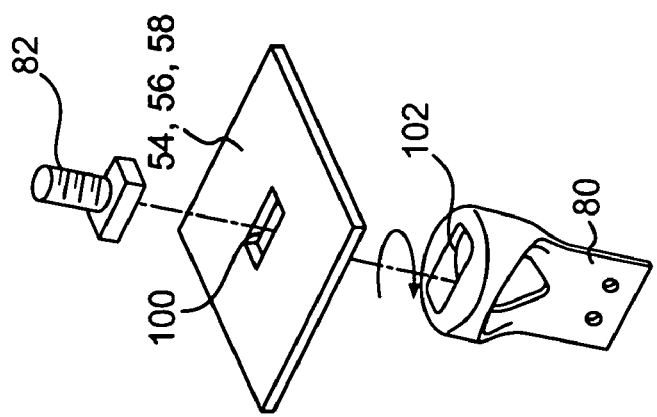
FIG. 7A is an exploded view of a duct bracket prior to assembly with a T-bolt.

Referring to FIG. 7A, the foldable attachment hanger system 60 is folded-up (FIG. 2B) and mechanically attachment to the respective duct case 54, 56, 58 from the outside thereof. Each duct case 54, 56, 58 includes corresponding duct case openings 100 which are preferably elongated or rectilinear similarly arranged to correspond with cold sheet openings 90 (FIG. 4A). Production liners use hardware w/rivet holes at detail and tabulated dash-numbers to provide one-to-one correspondence.

Once the foldable attachment hanger system 60 is folded-up as facilitated by the axial stiffener which permits entire rows of hanger assemblies 72 to be folded-up, the T-bolt 82 is passed through the duct case opening 100 and into a rectilinear duct bracket opening 102. Notably, the rectilinear duct bracket opening 102 is rotationally aligned with and essentially the same as the duct case opening 100. It should be understood, however, that openings of differing sizes and shapes will likewise be usable with the present invention.

The T-bolt 82 is then rotated ninety degrees within the duct bracket opening 102 to axially lock the T-bolt 82 into the duct bracket 80 (FIG. 7B). A ledge feature 104 in the duct bracket 80 below the duct bracket opening 102 prevents the T-bolt 82 from liberating itself from within the duct bracket 80 (FIGS. 8A and 8B).

Figure 8A:
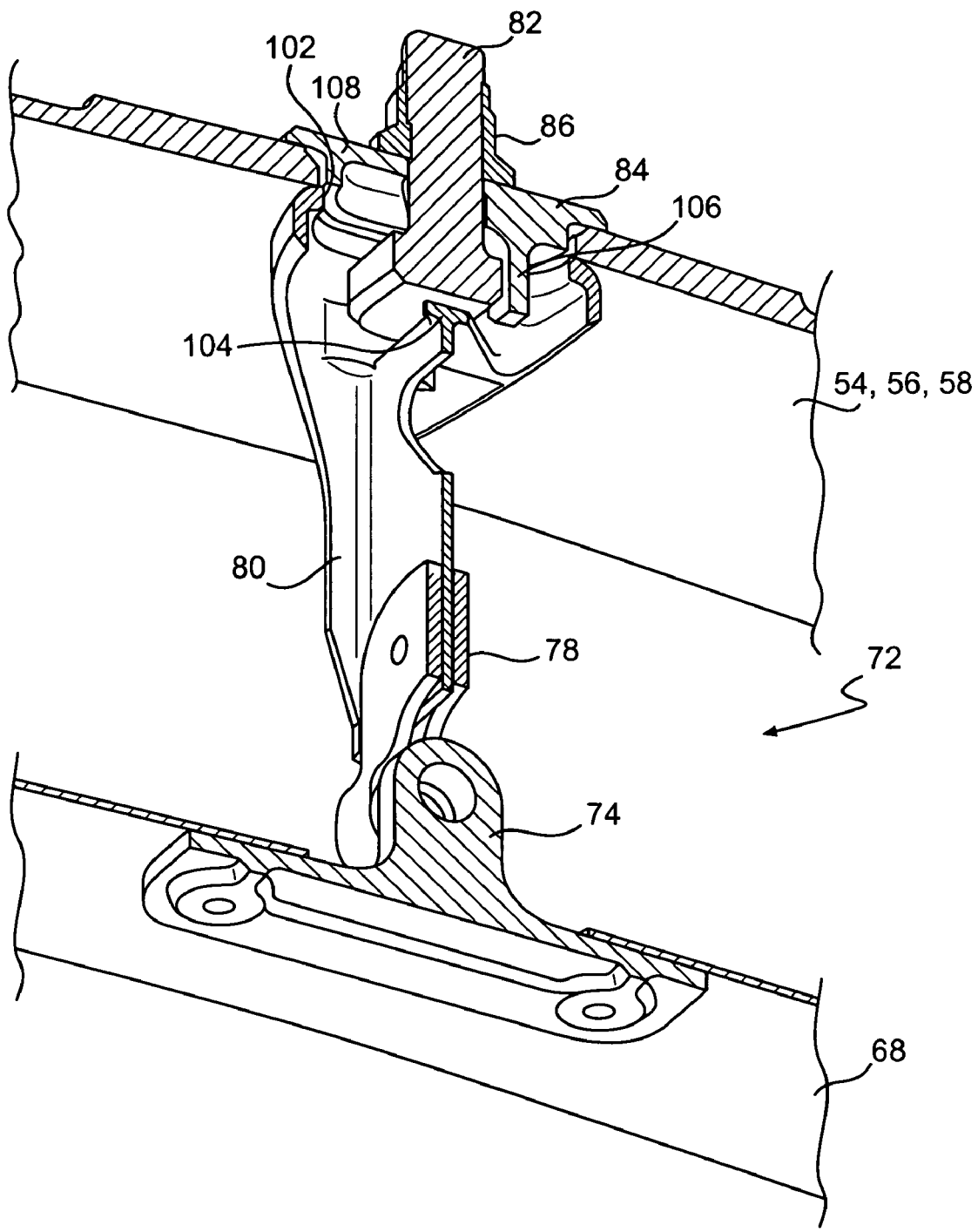
FIG. 8A is a sectional view of a foldable hanger assembly taken transverse to the hinge pin.
Figure 8B:
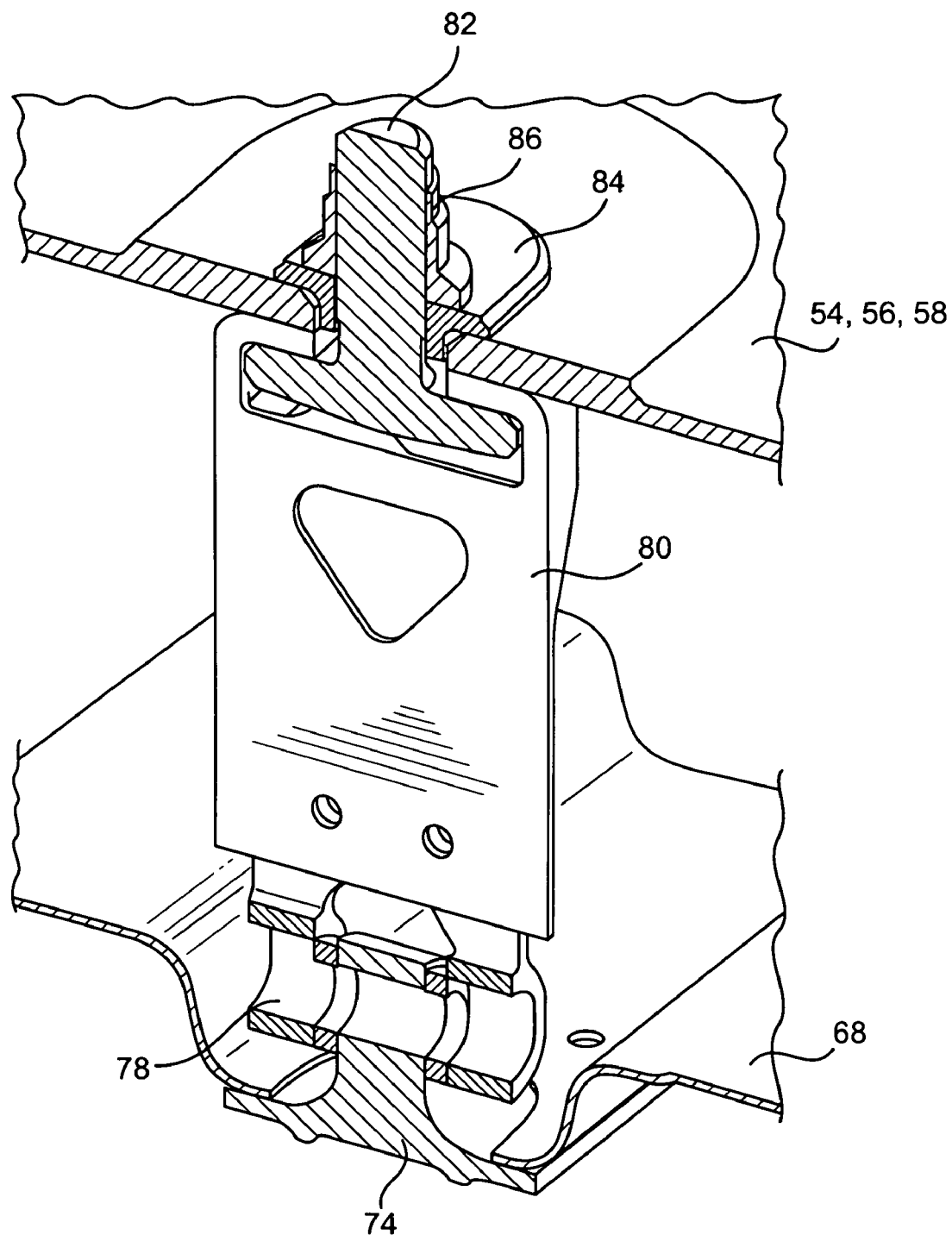
FIG. 8B is a sectional view of a foldable hanger assembly taken parallel to the hinge pin.

Once the T-bolt 82 is rotated into position, the flanged bushing 84 is inserted into the duct case opening 100 such that the bushing tabs 106 pass into the rectilinear duct bracket opening 102 to rotationally restrain the T-bolt 82 to essentially "mistake-proof" orientation (FIG. 8A). The flanged busing 84 preferably includes an inner flange 108 (FIG. 8A) which corresponds with the duct case opening 100 to again essentially "mistake-proof" orientation seal the duct case opening 100, and retain the T-bolt 82 in the desired locked orientation (FIGS. 8A and 8B). The contact footprint between the duct bracket 80 and the respective duct case 54, 56, 58 (FIGS. 7C, 8A and 8B) provide a relatively generous area to efficiently transfer load path to the exhaust duct section 28. The T-bolt 82 rectilinear head geometry is also preferably maximized to net a relatively large contact footprint within the minimal access duct bracket opening 102.

The threaded fastener 86 is then threaded onto the T-bolt 82 to finalize attachment. The flanged bushing 84 bushing tabs 106 and inner flange 108 respective engagement with the rectilinear duct bracket opening 102 and case opening 100 also serve as an anti-rotation feature for fastener torque application.

All fastening of the foldable attachment hanger system 60 is accomplished externally (from the outside) of the forward, intermediate and rear outer duct case 54, 56, 58. All fasteners 86 are thereby readily replaced externally without having to disassemble the engine or liner components. This is a highly desirable feature for those applications where the inboard space is limited. This arrangement also makes the likelihood of damage fastener threads minimal and reduces the assembly and repair time to replace a damage fastener by not requiring engine or liner hardware removal.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of assembling a swivelable exhaust duct assembly for a gas turbine engine comprising the steps of:
   (A) assembling a first exhaust duct case segment to a second exhaust duct case segment with a bearing joint therebetween, the bearing joint defining an inner diameter less than an inner diameter of the first exhaust duct case segment;
   (B) folding-down a foldable attachment hanger system attached to a cooling liner segment;
   (C) locating a cooling liner within the first exhaust duct case segment through the bearing joint;
   (D) folding-up the foldable attachment hanger system; and
   (E) attaching the foldable attachment hanger system to the first exhaust duct case segment.

2. A method as recited in claim 1, wherein said step (A) further comprises locating the bearing joint in a plane non-normal to a longitudinal axis of the first exhaust duct case.

3. A method as recited in claim 1, wherein said step (B) further comprises folding-down the foldable attachment hanger system in a direction tangential to the cooling liner segment.

4. A method as recited in claim 1, wherein said step (B) further comprises folding-down the foldable attachment hanger system such that the foldable attachment hanger system is at least partially received within a corrugation of a cold sheet of the cooling liner segment.

5. A method as recited in claim 1, wherein said step (D) further comprises folding-up the foldable attachment hanger system by rows defined along the length of the cooling liner segment, each row including a multitude of hanger bracket assemblies.

6. A method as recited in claim 1, wherein said step (E) further comprises attaching the foldable attachment hanger system to the first exhaust duct case segment from an outside of the first exhaust duct case.

7. A method as recited in claim 6, wherein said step (E) further comprises:
   (a) passing a T-bolt through a duct opening in the first exhaust duct case;
   (b) rotating the T-bolt into engagement with a duct bracket of a foldable attachment hanger assembly of the foldable attachment hanger system;
   (c) locating a flanged bushing at least partially into the duct opening and the duct bracket; and
   (d) threading a fastener to the T-bolt atop the flanged bushing.

8. A method as recited in claim 7, wherein said step (c) further comprises:
   (I) rotationally retaining the T-bolt into the duct bracket with the flanged bushing.

9. A method as recited in claim 8, wherein said step (i) further comprises:
   (i) trapping a head of the T-bolt with the flanged bushing to a predetermined rotational position.

10. A method as recited in claim 1, further comprising attaching a multiple of foldable attachment hangers of the foldable attachment hanger system through an axial stiffener.

11. A method as recited in claim 1, wherein said step (C) further comprises:
   axially inserting the cooling liner within the first exhaust duct case segment through the bearing joint and the second exhaust duct case segment.

* * * * *